(12) United States Patent
Mei et al.

(10) Patent No.: US 7,687,588 B2
(45) Date of Patent: Mar. 30, 2010

(54) PROCESS FOR THE GAS-PHASE POLYMERIZATION OF OLEFINS

(75) Inventors: Gabriele Mei, Ferrara (IT); Joachim T. M. Pater, Ferrara (IT); Gerben Meier, Frankfurt am Main (DE); Pietro Baita, Rovigo (IT)

(73) Assignee: Basel Poliolefine Italia s.r.l., Milan (IT)

( * ) Notice: Subject to any disclaimer, the term of this patent is extended or adjusted under 35 U.S.C. 154(b) by 160 days.

(21) Appl. No.: 11/920,312

(22) PCT Filed: May 9, 2006

(86) PCT No.: PCT/EP2006/062148
§ 371 (c)(1),
(2), (4) Date: Nov. 13, 2007

(87) PCT Pub. No.: WO2006/120187
PCT Pub. Date: Nov. 16, 2006

(65) Prior Publication Data
US 2009/0036617 A1    Feb. 5, 2009

Related U.S. Application Data

(60) Provisional application No. 60/682,352, filed on May 18, 2005.

(30) Foreign Application Priority Data
May 13, 2005    (EP) ................................. 05104036

(51) Int. Cl.
*C08F 2/34* (2006.01)
*C08F 12/02* (2006.01)
(52) U.S. Cl. ............................. 526/64; 526/65; 526/88; 526/901; 525/53

(58) Field of Classification Search ............... 526/64, 526/65, 88, 901; 525/53
See application file for complete search history.

(56) References Cited

U.S. PATENT DOCUMENTS 4,356,082 A    10/1982    Gross (Continued)

FOREIGN PATENT DOCUMENTS

EP    154334    9/1985

(Continued)

OTHER PUBLICATIONS

J. Yerushalmi, edited by D. Geldart, "High Velocity Fluidized Beds," *Gas Fluidization Technology*, John Wiley & Sons Ltd., p. 155-196 (1986).

*Primary Examiner*—Fred M Teskin
(74) *Attorney, Agent, or Firm*—Jarrod N. Raphael

(57) ABSTRACT

A process for the gas-phase polymerization of α-olefêns $CH_2=CHR$, where R is hydrogen or a hydrocarbon radical having 1-12 carbon atoms, carried out in a first and a second interconnected polymerization zones, wherein the growing polymer particles flow through the first of said polymerization zones (riser) under fast fluidization conditions, leave said riser and enter the second of said polymerization zones (downcomer) through which they flow downward in a densified form, leave said downcomer and are reintroduced into said riser, in which process: (a) the gas mixture present in the riser is totally or partially prevented from entering the downcomer, and (b) the gaseous composition inside a portion of the downcomer is maintained substantially similar to the gaseous composition reacting in the riser.

10 Claims, 1 Drawing Sheet

U.S. PATENT DOCUMENTS

Figure 1:
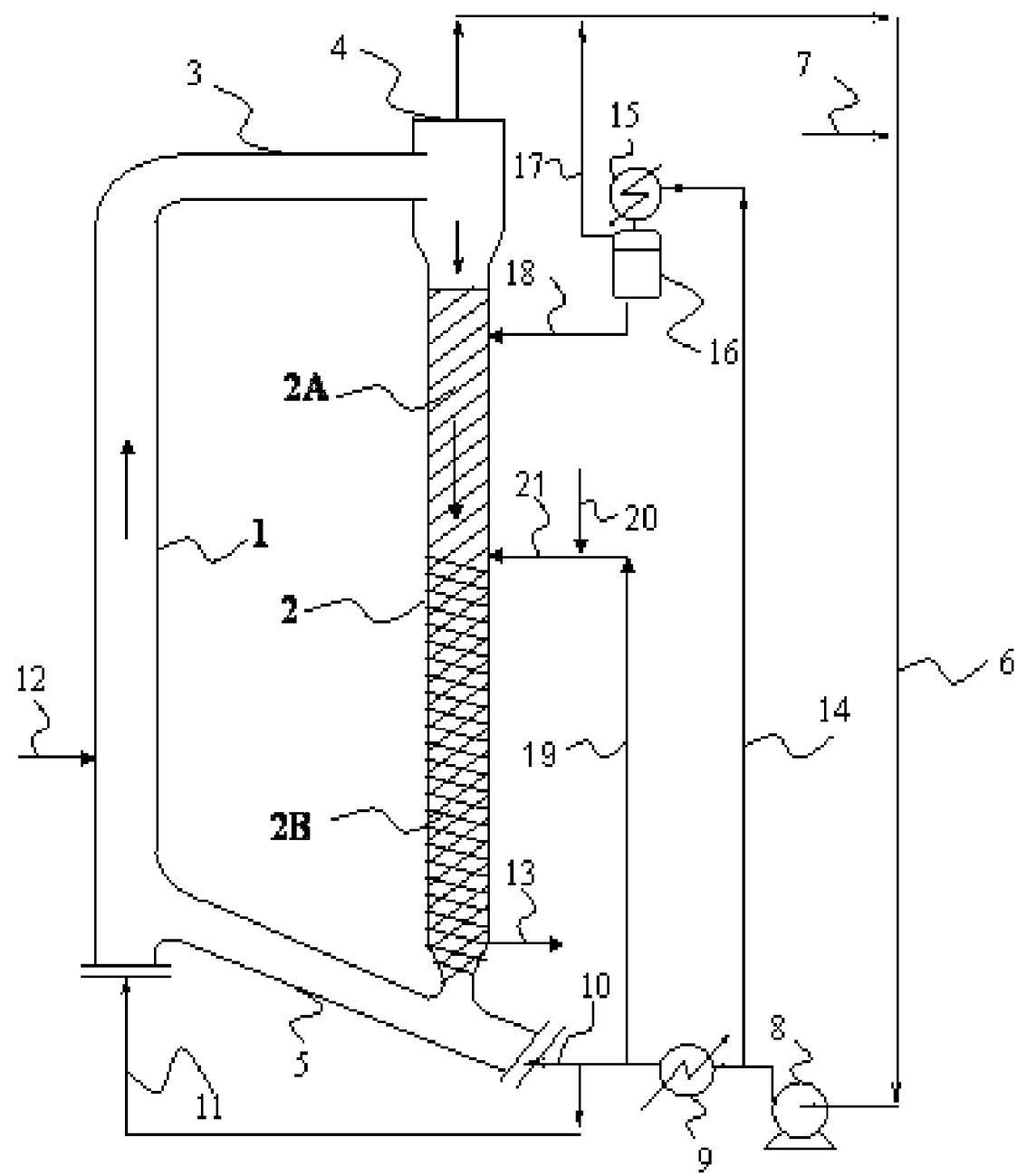

| | | | |
|---|---|---|---|
| 4,882,400 A | 11/1989 | Dumain et al. | |
| 5,698,642 A | 12/1997 | Govoni et al. | |
| 5,728,353 A | 3/1998 | Govoni et al. | |
| 5,898,053 A | 4/1999 | Leaney et al. | |
| 6,187,878 B1 | 2/2001 | Lalanne-Magne et al. | |
| 6,228,956 B1 | 5/2001 | Covezzi et al. | |
| 6,413,477 B1 | 7/2002 | Govoni et al. | |
| 6,689,845 B1 * | 2/2004 | Govoni et al. | 526/65 |
| 6,818,187 B2 | 11/2004 | Govoni et al. | |
| 7,022,640 B2 | 4/2006 | Morini et al. | |
| 7,049,377 B1 | 5/2006 | Morini et al. | |
| 7,524,903 B2 | 4/2009 | Mei et al. | |

FOREIGN PATENT DOCUMENTS

| | | |
|---|---|---|
| EP | 301872 | 2/1989 |
| EP | 478418 | 4/1992 |
| EP | 574821 | 12/1993 |
| EP | 728769 | 8/1996 |
| EP | 782587 | 7/1997 |
| EP | 824115 | 2/1998 |
| EP | 1012195 | 6/2000 |
| WO | 92/21706 | 12/1992 |
| WO | 97/04016 | 2/1997 |
| WO | 99/00430 | 1/1999 |
| WO | 00/02929 | 1/2000 |
| WO | 06/067052 | 6/2006 |

* cited by examiner

PROCESS FOR THE GAS-PHASE POLYMERIZATION OF OLEFINS

The present invention relates to a gas-phase polymerization process for the olefin polymerization carried out in a reactor having interconnected polymerization zones. In particular, the operative conditions selected in the polymerization process of the invention allow broadening the range of polymer compositions obtainable by means of a polymerization reactor having interconnected polymerization zones.

The development of olefin polymerization catalysts with high activity and selectivity, particularly of the Ziegler-Natta type and, more recently, of the metallocene type, has led to the widespread use on an industrial scale of processes in which the polymerization of olefins is carried out in a gaseous medium in the presence of a solid catalyst.

A widely used technology for gas-phase polymerization processes is the fluidized bed technology. In fluidized bed gas-phase processes, the polymer is confined in a vertical cylindrical zone. The reaction gases exiting the reactor are taken up by a compressor, cooled and sent back, together with make-up monomers and appropriate quantities of hydrogen, to the bottom of the bed through a distributor. Entrapment of solid in the gas is limited by an appropriate dimensioning of the upper part of the reactor (freeboard, i.e. the space between the bed surface and the gas exit point), where the gas velocity is reduced, and, in some designs, by the interposition of cyclones in the exit gas line. The flow rate of the circulating gas is set so as to assure a velocity within an adequate range above the minimum fluidization velocity and below the "transport velocity". The heat of reaction is removed exclusively by cooling the circulating gas. The composition of the gas-phase controls the composition of the polymer, while the reaction kinetics is controlled by the addition of inert gases. The reactor is operated at constant pressure, normally in the range 1-4 MPa.

A significant contribution to the reliability of the fluidized-bed reactor technology in the polymerization of α-olefins was made by the introduction of suitably pre-treated spheroidal catalyst of controlled dimensions and by the use of propane as a diluent. Since fluidized-bed reactors approximate very closely the ideal behaviour of a "continuous stirred-tank reactor" (CSTR), it is very difficult to obtain products which are a homogeneous mixture of different types of polymeric chains. In fact, the composition of the gaseous mixture that is in contact with the growing polymer particle is essentially the same for all the residence time of the particle in the reactor. As a consequence, one of the major limits of fluidized-bed processes is the difficulty of broadening the molecular weight distribution of the obtained polymers. The broadness of the molecular weight distribution has an influence both on the rheological behaviour of the polymer (and hence the processability of the melt) and on the final mechanical properties of the product, and is a characteristic which is particularly important for (co)polymers based on ethylene or propylene.

This problem has been addressed in EP 782 587. According to this patent, it is possible to broaden the molecular weight distribution of polymers without affecting their homogeneity by means of a gas-phase process performed in a loop reactor responding to particular criteria of design. The gas-phase polymerization according to EP 782 587 is carried out in two interconnected polymerization zones to which one or more monomers are fed in the presence of a catalyst under reaction conditions and from which the polymer produced is discharged. The process is characterized in that the growing polymer particles flow through the first of said polymerization zones under fast fluidization conditions, leave said first polymerization zone and enter the second polymerization zone, through which they flow in a densified form under the action of gravity, leave the second polymerisation zone (hereinafter "downcomer") and are reintroduced into the first polymerisation zone (hereinafter "riser"), thus establishing a circulation of polymer between the two polymerisation zones.

According to the teachings of EP 782 587, it is possible to broaden the molecular weight distribution of the polymers simply by properly balancing the gas-phase compositions and the residence times in the two polymerisation zones of the gas-phase loop reactor. This is due to the fact that, while the polymer moves downward in the second polymerization zone flowing in a plug-flow mode, owing to the monomer consumption, it finds gas-phase compositions richer in molecular weight regulator. Consequently, the molecular weights of the forming polymer decrease along the axis of this polymerisation zone.

However, the process described in EP 782 587 can provide only a limited control of the molecular weight distribution and is unable to prepare blends of two different (co)polymers. In fact, even if hindered by the presence of the packed polymer, the diffusion of the gas within the downcomer occurs, so that it is not possible to establish substantial differences in the monomer compositions between the riser and the downcomer.

An improvement over EP 782 587 is given by the polymerization process disclosed in EP 1012195, where the above described gas-phase reactor having interconnected polymerization zones is made more flexible and also suitable to the preparation of polymers endowed with broad composition distributions, while at the same time maintaining a high homogeneity level of the obtained polymer product. According to the teaching of EP 1012195, it is possible to obtain, within the reactor, two polymerization zones at different compositions by feeding a gas or liquid mixture to the top of the second polymerization zone. Said mixture acts as a barrier to the gas coming from the first polymerization zone. The introduction of the gas and/or liquid mixture of different composition in the second polymerization zone is such to establish a net gas flow upward at the upper limit of this polymerization zone. The established flow of gas upward has the effect of preventing the gas mixture present in the first polymerization zone from entering the second polymerization zone.

The embodiment disclosed in EP 1012195 is particularly useful to prepare bimodal homopolymers or copolymers, however the peculiar design of this gas-phase reactor, as well as the polymerization conditions established within the riser and the downcomer give rise to restrictions on the individual throughput of each polymerization zone.

Specifically, the polymer hold-up in the downcomer is poorly tunable due to the densified conditions of the polymer particles descending along this polymerization zone. The condition of packed flow of densified polymer makes it impossible increasing in a significant way the amount of polymer formed in this polymerization zone: in fact the solid density (kg of polymer per $m^3$ of reactor) inside the downcomer nearly approaches the bulk density of the formed polymer, so that this parameter cannot be further increased without clogging this polymerization zone. On the other hand, the density of solid cannot be significantly decreased, otherwise the densified conditions are not more satisfied and a steady recirculation of polymer throughtout the reactor cannot be accomplished. As a consequence, the only parameter which is slightly changeable is the volume of polymer bed filling the downcomer: however, this parameter can be only slightly modified by varying the height of the polymer bed filling the downcomer to an extent not higher than 5%. Accordingly, the hold-up of (co)polymer produced in the downcomer can be varied of an amount not higher than 5% by weight.

As regards the first polymerization zone, the operative conditions of fast fluidizations of the polymer make the throughput of the riser more tunable with respect to the downcomer: the polymer bed inside the riser can be rather diluted as well as slightly densified, while maintaining fast fluidization conditions. In particular, the density of solid in the riser can be ranged between a minimum value of about 50 $Kg/m^3$ and a maximum value of about 250 $Kg/m^3$, while maintaining fast fluidization conditions. On the other hand, the volume of polymer bed inside the riser cannot be modified, both the diameter and the height of the polymer bed inside the riser being fixed by the functional design of the reactor.

In view of the above technical considerations, when feeding a gas/liquid barrier of suitable composition to the top of the downcomer so as to differentiate the monomers composition in the riser from the monomers composition in the downcomer, the maximum split of (co)polymer obtainable from the riser is achieved by operating the riser with a density of solid of about 250 $Kg/m^3$ and simultaneously by operating the downcomer according to a situation of minimum height of the densified polymer bed. However, even working according to this border-line condition, the split of polymer composition formed in the riser cannot overcome the amount of 60% by weight. As a consequence, some polymer compositions having a remarkable industrial interest, such as bimodal polyethylene blends or polypropylene blends, wherein one of the two polymeric components is present in an amount higher than 70% by weight, cannot be prepared according to the technical indications given in the above prior art patents. Furthermore, according to the current industrial techniques, such peculiar polyolefins blends are commonly prepared by using a sequence of two polymerization reactors, suitably tailoring the process conditions in each reactor to prepare a first polymer component in a first reactor and the second polymer component in the second reactor. However, these multistage polymerization processes lead to final (co)polymer blends suffering of a lack in homogeneity. In fact, in each reactor of said cascade-processes a different polymer is generated in term of molecular weight, chemical composition and cristallinity, so that the final polymer blend shows an intrinsic heterogeneity, caused by the inherent difference in the residence times of the polymer particles exiting each polymerization step.

In view of the above, it would be highly desirable to overcome the drawbacks of poor homogeneity given by the conventional multistage polymerization processes by modifying the polymerization process described in EP 1012195, so as to achieve a complete flexibility in the mutual ratio of the (co) polymer components, which are prepared in the interconnected polymerization zones.

It is therefore an object of the present invention a process for the gas-phase polymerization of α-olefins $CH_2=CHR$, where R is hydrogen or a hydrocarbon radical having 1-12 carbon atoms, carried out in a first and a second interconnected polymerization zones, to which one or more of said α-olefins are fed in the presence of a catalyst under reaction conditions and from which the polymer product is discharged, wherein the growing polymer particles flow through the first of said polymerization zones (riser) under fast fluidization conditions, leave said riser and enter the second of said polymerization zones (downcomer) through which they flow downward in a densified form, leave said downcomer and are reintroduced into said riser, in which process:

(a) the gas mixture present in the riser is totally or partially prevented from entering the downcomer, and (b) the gaseous composition inside a portion of the downcomer is maintained substantially similar to the gaseous composition reacting in the riser.

The operative conditions selected in the process according to the present invention allow widening the range of polymer compositions directly obtainable from a single gas-phase reactor having interconnected polymerization zones. By way of an example, bimodal polyethylene blends comprising the low molecular weight component in an amount higher than 70% by wt or, alternatively, polypropylene blends of a homopolymer and a random copolymer comprising a homopolymer component in an amount lower than 30% by wt, can be directly prepared and discharged from said gas-phase polymerization reactor.

A relevant advantage of the present invention is therefore obtaining the above polyolefin blends by means of a single gas-phase polymerization reactor, without any substantial limitation as regards the mutual ratio of the (co)polymer components contained in the polyolefin blends.

To produce the above polyolefin blends a gas-phase reactor having interconnected polymerization zones of the type described in EP 782 587 and EP 1012195 is exploited. In the first polymerization zone (riser), fast fluidization conditions are established by feeding a gas mixture comprising one or more alpha-olefins at a velocity higher than the transport velocity of the polymer particles. The velocity of said gas mixture is generally comprised between 0.5 and 15 m/s, preferably between 0.8 and 5 m/s. The terms "transport velocity" and "fast fluidization conditions" are well known in the art; for a definition thereof, see, for example, "D. Geldart, Gas Fluidisation Technology, page 155 et seq., J. Wiley & Sons Ltd., 1986".

In the second polymerization zone (downcomer), the polymer particles flow under the action of gravity in a densified form, so that high values of density of the solid are reached (mass of polymer per volume of reactor), which approach the bulk density of the polymer. In other words, the polymer flows vertically down through the downcomer in a plug flow (packed flow mode), so that only small quantities of gas are entrained between the polymer particles.

The operating parameters, such as temperature and pressure, are those that are usual in gas-phase catalytic polymerization processes. For example, in both the riser and downcomer the temperature is generally comprised between 50° C. and 120° C., while the pressure can ranges from 0.5 to 10 MPa.

According to the process of the present invention the two interconnected polymerization zones are operated by satisfying both the conditions (a) and (b). In particular, the condition (a) requires the gas mixture coming from the riser to be partially or totally prevented from entering the downcomer. Conveniently, said condition can be achieved by introducing into the upper part of the downcomer a gas and/or liquid mixture having a composition different from the gaseous mixture present in the riser. One or more introduction lines, preferably placed at a point close to the upper limit of the volume occupied by the densified solid, can be used to this aim.

This gas/liquid mixture to be fed into the upper part of the downcomer partially or totally replaces the gas mixture entrained with the polymer particles entering the downcomer. The flow rate of this gas/liquid mixture can be regulated, so that a flow of gas counter-current to the flow of polymer particles is originated in the upper part of the downcomer, thus acting as a barrier to the gas mixture coming from the riser which is entrained among the polymer particles. The established flow of gas upward has the effect of preventing the gas mixture present in the riser from entering the downcomer.

The mixture of different composition to be fed at the upper part of the downcomer can be in a partially or totally liquefied form. The liquefied gas mixture can also be sprinkled over the upper surface of the bed of densified polymer particles; the evaporation of the liquid in the polymerization zone will provide the required gas flow.

Moreover, the above stated condition (b) requires maintaining inside a portion of the downcomer a gaseous composition which is substantially similar to the gaseous composition reacting in the riser. This means that, according to the invention, the molar amounts of the different gaseous components and/or their molar ratios are maintained substantially at comparable values both in the riser and in a portion of the downcomer. The effect of condition (b) is preparing inside a sub-portion of downcomer a (co)polymer substantially similar to the (co)polymer produced in the riser. Conveniently, condition (b) can be implemented by feeding a fluid of a suitable composition in correspondence of the upper level of said portion of the downcomer. According to the present invention, said fluid of a suitable composition can be either a gaseous mixture or a gas/liquid mixture. Hereinafter, in the present description said fluid of a suitable composition fed into the downcomer for satisfying the condition (b) will be referred with the term "corrective fluid".

The composition of this corrective fluid has to be suitably selected in order to obtain, downstream its introduction point, a portion of downcomer characterized by a gas composition substantially similar to the gas composition present in the riser. This means that the mutual mixing between said corrective fluid and the gas flowing downwardly in the downcomer is such to give, downstream the feeding point of said corrective fluid, a gaseous mixture having substantially the same composition of the riser (condition b). According to the present invention, the split of one of the two (co)polymer components prepared by the polymerization process can be easily adjusted by rising or lowering along the downcomer the feeding point of said corrective fluid. Therefore, the split of a (co)polymer component prepared in the riser can be increased up to values in the order of 70-95% by weight.

The corrective fluid comes preferably from the recycle gas stream, which is continuously recycled from the solid/gas separation zone placed at the top of the downcomer to the bottom of the riser. As a consequence, said corrective fluid contains, besides the monomers to be polymerized, also condensable inert compounds used as a polymerization diluent: the preferred ones are aliphatic hydrocarbons $C_2$-$C_8$. Moreover, the composition of said corrective fluid coming from the recycle gas line can be suitably adjusted by feeding make-up monomers, polymerization diluents and hydrogen before its introduction into the downcomer.

The process of the present invention will now be described in detail with reference to the enclosed FIGURE, which has to be considered illustrative and not limitative of the scope of the invention.

FIG. 1 is a diagrammatic representation of the gas-phase polymerization process according to the present invention.

The polymerization reactor comprises a riser 1 wherein the polymer particles flow upward under fast fluidization conditions and a downcomer 2, wherein the polymer particles flow downward under the action of gravity. The downcomer 2 comprises an upper area 2A marked by transversal lines and a bottom area 2B marked by crossed lines. The two polymerization zones 1 and 2 are appropriately interconnected by the sections 3 and 5. The catalyst components, preferably after a prepolymerization step, are continuously introduced via line 12 into the riser 1. A gaseous mixture comprising one or more olefins, hydrogen and optionally an alkane as a diluent gas is fed to the reactor via one or more lines 7, suitable placed at any point of the gas recycle line 6 according to the knowledge of those skilled in art.

The growing polymer particles and the gaseous mixture leaving the riser 1 are conveyed to a solid/gas separation zone 4, from which the polymer particles enter the downcomer 2. A gaseous mixture is collected in the upper portion of said separation zone 4, before entering the gas recycle line 6. This gaseous mixture is compressed by means of the compression means 8 and then split in two gaseous streams. The first one is cooled by the cooling device 9, and then fed to the connection zone 5 via line 10 and to the bottom of the riser 1 via line 11. The other gaseous stream, obtained downstream the compression means 8, is fed via line 14 to the condenser 15, where it is cooled to a temperature at which the monomers and optional condensable inert gases are partially condensed. A separating vessel 16 is placed downstream the condenser 15. The separated gaseous mixture, enriched in hydrogen, is send via line 17 to the recycle line 6. On the contrary, the liquid obtained from the condensation step is passed to line 18 before to be fed to the upper part of the downcomer 2. By means of line 18 the gas mixture present in the riser 1 is totally or partially prevented from entering the downcomer 2, thus carrying out the operative condition (a) of the present invention. Simultaneously, a part of the recycle gas stream exiting the cooling device 9 is transferred to the downcomer 2 via line 19. Before the introduction into the downcomer the chemical composition of line 19 is suitable adjusted by feeding make-up monomers, inert diluents and hydrogen via line 20, so as to obtain the desired corrective fluid 21, as above defined. The feeding of said corrective fluid via line 21 makes the gaseous composition inside the portion 2B of the downcomer as much as possible similar to the gaseous composition present in the riser, thus implementing the operative condition (b) of the present invention.

The operative conditions (a) and (b) of the process of the invention allows preparing a first polymer component in the portion 2A of the downcomer, while a second polymer component is formed inside the riser and the portion 2B of the downcomer. The obtained polymer blend is then continuously discharged from the bottom of the downcomer via line 13.

The polymerization process of the invention allows the preparation of a large number of polyolefin blends with a large flexibility as regards the mutual ratio of the (co)polymer components contained in the blend. In fact, the feeding of the corrective fluid at a higher point of the downcomer allows to enlarge the portion 2B, thus increasing the percentage of the (co)polymer component formed in said portion 2B and in the riser. Examples of polyolefin blends that can be obtained are:
  bimodal polyethylene blends containing the low molecular weight component in an amount higher than 70% by wt;
  polypropylene blends containing a PP homopolymer in an amount lower than 30% by wt and a PP random copolymer in an amount higher than 70% by wt;
  heterophasic propylene copolymers containing two copolymers of different ethylene content, wherein the amount of copolymer with the higher ethylene content is greater than 70% by wt.

The above defined bimodal polyethylene blends obtained by means of the present invention are particularly suitable to be subjected to injection molding for preparing shaped articles.

The above defined heterophasic propylene copolymers obtained by means of the present invention are particularly suitable for producing items endowed with a high balance of stiffness and impact resistance. These mechanical properties are particularly noteworthy in the automotive industry to produce interior trims and bumpers.

The polymerization process of the present invention can be carried out upstream or downstream other conventional polymerization technologies (either in a liquid-phase or a gas-phase) to give rise a sequential multistage polymerization process. For instance, a fluidised bed reactor can be used to prepare a first polymer component, which is successively fed to the gas-phase reactor of FIG. 1 to prepare a second and a third polymer component. Accordingly, an ethylene polymer endowed with a tri-modal molecular weight distribution can be obtained, as well as a polypropylene blend comprising three components having a different content in ethylene.

The polymerization process of the invention can be carried out in the presence of a highly active catalyst system of the Ziegler-Natta or metallocene type.

A Ziegler-Natta catalyst system comprises the catalysts obtained by the reaction of a transition metal compound of groups 4 to 10 of the Periodic Table of Elements (new notation) with an organometallic compound of group 1, 2, or 13 of the Periodic Table of element.

In particular, the transition metal compound can be selected among compounds of Ti, V, Zr, Cr, and Hf. Preferred compounds are those of formula $Ti(OR)_nX_{y-n}$ in which n is comprised between 0 and y; y is the valence of titanium; X is halogen and R is a hydrocarbon group having 1-10 carbon atoms or a COR group. Among them, particularly preferred are titanium compounds having at least one Ti-halogen bond such as titanium tetrahalides or halogenalcoholates. Preferred specific titanium compounds are $TiCl_3$, $TiCl_4$, $Ti(OBu)_4$, $Ti(OBu)Cl_3$, $Ti(OBu)_2Cl_2$, $Ti(OBu)_3Cl$.

Preferred organometallic compounds are the organo-Al compounds and in particular Al-alkyl compounds. The alkyl-Al compound is preferably chosen among the trialkyl aluminum compounds such as for example triethylaluminum, tri-isobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds. Particularly suitable high yield ZN catalysts are those wherein the titanium compound is supported on magnesium halide in active form which is preferably $MgCl_2$ in active form. As internal electron donor compounds can be selected among esters, ethers, amines, and ketones. In particular, the use of compounds belonging to 1,3-diethers, phthalates, benzoates and succinates is preferred.

Further improvements can be obtained by using, in addition to the electron-donor present in the solid component, an electron-donor (external) added to the aluminium alkyl co-catalyst component or to the polymerization reactor. These external electron donor can be the same as, or different from, the internal donor. Preferably they are selected from alkoxysilanes of formula $R_a^1R_b^2Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane. Moreover, are also preferred the silicon compounds in which a is 0, c is 3, $R^2$ is a branched alkyl or cycloalkyl group and $R^3$ is methyl. Examples of such preferred silicon compounds are cyclohexyltrimethoxysilane, t-butyltrimethoxysilane and thexyltrimethoxysilane.

The above cited catalysts show, in addition to a high polymerization activity, also good morphological properties that make them particularly suitable for the use in the gas-phase polymerization process of the invention.

Also metallocene-based catalyst systems can be used in the process of the present invention and they comprise:

at least a transition metal compound containing at least one π bond;

at least an alumoxane or a compound able to form an alkyl-metallocene cation; and optionally an organo-aluminum compound.

A preferred class of metal compound containing at least one π bond are metallocene compounds belonging to the following formula (I):

$$Cp(L)_qAMX_p \qquad (I)$$

wherein

M is a transition metal belonging to group 4, 5 or to the lanthanide or actinide groups of the Periodic Table of the Elements; preferably M is zirconium, titanium or hafnium;

the substituents X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, wherein $R^6$ is a hydrocarbon radical containing from 1 to 40 carbon atoms;

preferably, the substituents X are selected from the group consisting of —Cl, —Br, -Me, -Et, -n-Bu, -sec-Bu, -Ph, -Bz, -$CH_2SiMe_3$, -OEt, —OPr, -OBu, -OBz and -$NMe_2$;

p is an integer equal to the oxidation state of the metal M minus 2;

n is 0 or 1; when n is 0 the bridge L is not present;

L is a divalent hydrocarbon moiety containing from 1 to 40 carbon atoms, optionally containing up to 5 silicon atoms, bridging Cp and A, preferably L is a divalent group $(ZR^7_2)_n$;

Z being C, Si, and the $R^7$ groups, equal to or different from each other, being hydrogen or a hydrocarbon radical containing from 1 to 40 carbon atoms;

more preferably L is selected from $Si(CH_3)_2$, $SiPh_2$, $SiPhMe$, $SiMe(SiMe_3)$, $CH_2$, $(CH_2)_2$, $(CH_2)_3$ or $C(CH_3)_2$;

Cp is a substituted or unsubstituted cyclopentadienyl group, optionally condensed to one or more substituted or unsubstituted, saturated, unsaturated or aromatic rings;

A has the same meaning of Cp or it is a $NR^7$, —O, S, moiety wherein $R^7$ is a hydrocarbon radical containing from 1 to 40 carbon atoms;

Alumoxanes used as component b) are considered to be linear, branched or cyclic compounds containing at least one group of the type:

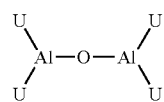

wherein the substituents U, same or different, are defined above.

In particular, alumoxanes of the formula:

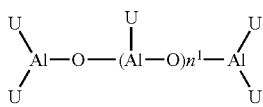

can be used in the case of linear compounds, wherein $n^1$ is 0 or an integer of from 1 to 40 and where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number; or alumoxanes of the formula:

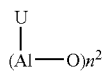

can be used in the case of cyclic compounds, wherein $n^2$ is an integer from 2 to 40 and the U substituents are defined as above.

The following examples will further illustrate the present invention without limiting its scope.

EXAMPLES

Characterization

Melt index L (MIL): ASTM-D 1238 (230° C./2.16 Kg)
Density: ASTM-D 792
Solubility index (X.S.): in xylene at 25° C.
Intrinsic viscosity of xylene soluble fraction: in tetrahydronaphtalene at 135° C.
Flexural elasticity modulus (MEF): ASTM D-790.
IZOD impact: ASTM D-4101
Polydispersity index (PI): this property is strictly connected with the molecular weight distribution of the polymer under examination. It is inversely proportional to the creep resistance of the polymer in molten state. Said resistance, called modulus separation at low modulus value, i.e. 500 Pa, was determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus one can derive the P.I. by way of the equation:

$$P.I.=10^5/Gc$$

in which Gc is the crossover modulus which is defined as the value (expressed in Pa) at which G'=G" wherein G' is the storage modulus and G" is the loss modulus Example 1

Preparation of a Polypropylene Blend

The process of the invention was carried out under continuous conditions in a plant comprising a reactor having interconnected polymerization zones, as shown in FIG. 1.

The set of operative conditions allows preparing a propylene homopolymer in the portion 2A of the downcomer, while a random copolymer of propylene and ethylene is formed inside the riser and the portion 2B of the downcomer.

A Ziegler-Natta catalyst was used as the polymerization catalyst, comprising:
a titanium solid catalyst component prepared with the procedure described in EP 728 769, Example 5, lines 46 to 53, according to which di-isobutyl phthalate is used as an internal donor compound;
triethylaluminium (TEAL) as a cocatalyst;
dicyclopentyldimethoxysilane as an external donor.

About 3 g/h of solid catalyst component are fed to a pre-contacting vessel, the weight ratio TEAL/solid component being of 7, the weight ratio TEAL/external donor being of 4. The above catalyst components are pre-contacted at a temperature of 15° C. for 10 minutes. The catalyst, after prepolymerization with propylene, was fed via line 12 to the gas-phase polymerization reactor of FIG. 1. Propylene was polymerized using $H_2$ as the molecular weight regulator and in the presence of propane as inert diluent. The polymerization was carried out at a temperature of 80° C. and at a pressure of 2.5 MPa.

Condition (a) as claimed in the process of the present invention was achieved by introducing a barrier fluid via line 18 into the upper part of the downcomer. The composition of said barrier fluid is given in Table 1.

Condition (b) as claimed in the process of the present invention was implemented by introducing a corrective fluid via line 21 into the downcomer. The composition of said corrective fluid is given in Table 1.

The feeding of said corrective fluid via line 21 makes the gaseous composition in the portion 2B of the downcomer similar to the gaseous composition present in the riser. The compositions of the gas phases inside the riser 1 and inside the portions 2A and 2B of the downcomer are given in Table 2.

The obtained polypropylene blend is continuously discharged from the bottom of the downcomer via line 13. The properties of the obtained polymer composition were analyzed. As shown in Table 3, the polypropylene resin had a melt index MIL of 5.8, an ethylene content of 4.0% and a fraction soluble in xylene of 5.1% by weight.

The amount of polymer component prepared in the riser and in portion 2B was equal to 80% by weight with respect to the total blend.

Example 2

Preparation of a Heterophasic Propylene Copolymer

A heterophasic propylene copolymer was produced by means of a sequence of two serially connected gas-phase reactors, each reactor having interconnected polymerization zones (riser and downcomer).

The same catalyst system of Example 1 was used. The catalyst together with propylene was fed to the first gas-phase reactor for producing a crystalline propylene homopolymer. The polymerization was carried out at a temperature of 75° C. and at a pressure of 2.8 MPa. The first reactor produced about 72% by weight (split wt %) of the total amount of polymer produced by both first and second reactors. The propylene homopolymer obtained from the first reactor was continuously discharged, separated from the gas in a gas/solid separator, and introduced in the second gas-phase reactor having the configuration shown in FIG. 1.

Said second gas-phase reactor was aimed at preparing an amorphous polymer fraction by copolymerizing ethylene with propylene. The second reactor was operated under polymerization conditions at a temperature of about 73° C., and a pressure, of about 1.9 MPa.

The set of operative conditions in this second reactor allows preparing two ethylene/propylene copolymers having a different content of ethylene, the first copolymer being prepared in the portion 2A of the downcomer and the second one being prepared inside the riser and the portion 2B of the downcomer.

Condition (a) as claimed in the process of the present invention was achieved by introducing a barrier fluid via line 18 into the upper part of the downcomer. The composition of said barrier fluid is given in Table 1.

Condition (b) as claimed in the process of the present invention was implemented by introducing a corrective fluid via line 21 into the downcomer. The composition of said corrective fluid is given in Table 1.

The feeding of said corrective fluid via line 21 makes the gaseous composition in the portion 2B of the downcomer similar to the gaseous composition present in the riser. The ethylene and propylene concentrations inside the riser 1 and inside the portions 2A and 2B of the downcomer are given in Table 2. The obtained heterophasic polypropylene copolymer is continuously discharged from the bottom of the downcomer via line 13.

The amount of copolymer prepared in the riser and in portion 2B was equal to 75% by weight with respect to the total blend.

Table 3 indicates the properties of the obtained heterophasic copolymer having a good balance of stiffness and impact resistance. The IZOD impact value at 23° C. is of 10.5 kJ/m$^2$, while the flexural modulus is of 1007 MPa.

Example 3

Preparation of a Bimodal Polyethylene Blend

The process of the invention was carried out under continuous conditions in a plant comprising a reactor having interconnected polymerization zones, as shown in FIG. 1.

The set of operative conditions allows preparing a high molecular weight (HMW) polyethylene in the portion 2A of the downcomer and a low molecular weight (LMW) polyethylene inside the riser and the portion 2B of the downcomer.

A Ziegler-Natta catalyst was used as the polymerization catalyst, comprising:
a titanium solid catalyst component prepared with the procedure described in WO 92/21706, Example 1, according to which diisobutyl phthalate is used as an internal donor compound;
triethylaluminium (TEAL) as a cocatalyst;

About 6 g/h of solid catalyst component are fed to a pre-contacting vessel, the weight ratio TEAL/solid component being of 6. The above catalyst components are pre-contacted at a temperature of 15° C. for 10 minutes.

The catalyst, after prepolymerization with propylene, was fed via line 12 to the gas-phase polymerization reactor of FIG. 1. Ethylene was polymerized using $H_2$ as the molecular weight regulator and in the presence of propane as inert diluent. The polymerization was carried out at a temperature of 80° C. and at a pressure of 2.5 MPa.

Condition (a) as claimed in the process of the present invention was achieved by introducing a barrier fluid via line 18 into the upper part of the downcomer. The composition of said barrier fluid is given in Table 1.

Condition (b) as claimed in the process of the present invention was implemented by introducing a corrective fluid via line 21 into the downcomer. The composition of said corrective fluid is given in Table 1.

The compositions of the gas phases inside the riser 1 and inside the portions 2A and 2B of the downcomer are given in Table 2. The feeding of said corrective fluid via line 21 makes the gaseous composition in the portion 2B of the downcomer similar to the gaseous composition present in the riser, as witness by the comparable values of the ratios $H_2/C_2H_4$ and $C_6/(C_6+C_2)$ in Table 2.

A polyethylene component having a low molecular weight and a low level of hexene modification was produced in the riser and 2B. A high molecular weight polyethylene component with a higher content of hexene was produced in 2A.

The obtained bimodal polyethylene blend is continuously discharged from the bottom of the downcomer via line 13.

The properties of the bimodal polyethylene produced in this way were measured, and are given in Table 3. The polyethylene resin had a melt index MIP of about 20 and a density of 0.955 g/cc.

The amount of polymer component prepared in the riser and in portion 2B was equal to 90% by weight.

TABLE 1

Composition of the barrier and corrective fluid

| | Example 1 | | Example 2 | | Example 3 | |
|---|---|---|---|---|---|---|
| | Barrier | Corrective fluid | Barrier | Corrective fluid | Barrier | Corrective fluid |
| Propylene % mol | 77 | 87.1 | 50.6 | 36.1 | — | — |
| Propane % mol | 21 | 5.2 | 44.9 | 33.0 | 92.9 | 32.0 |
| Ethylene % mol | — | 4.6 | 0.1 | 28.4 | 6.38 | 50.4 |
| Hydrogen % mol | 2 | 3.1 | 4.3 | 2.5 | 0.13 | 17.6 |
| Hexene % mol | — | — | — | — | 0.61 | — |
| $H_2/C_3H_6$ | 0.026 | 0.036 | 0.085 | 0.069 | — | — |
| $C_2H_4/(C_2H_4 + C_3H_6)$ | 0.000 | 0.050 | 0.002 | 0.440 | — | — |
| $H_2/C_2H_4$ | — | — | — | — | 0.020 | 0.349 |
| $C_6/(C_6 + C_2)$ | — | — | — | — | 0.087 | 0.000 |

TABLE 2

Composition of the gas phase in sections 1, 2A and 2B

| | | Example 1 | | | Example 2 | | | Example 3 | | |
|---|---|---|---|---|---|---|---|---|---|---|
| | | Riser 1 | Downer 2A | Downer 2B | Riser 1 | Downer 2A | Downer 2B | Riser 1 | Downer 2A | Downer 2B |
| Propylene % mol | | 76.8 | 77.1 | 75.0 | 36.4 | 55.4 | 36.2 | — | — | — |
| Propane % mol | | 17.9 | 21.2 | 20.1 | 33.6 | 25.3 | 35.3 | 73.5 | 96.0 | 86.5 |
| Ethylene % mol | | 2.8 | 0.2 | 2.5 | 27.5 | 14.7 | 25.6 | 10.0 | 3.0 | 5.0 |
| Hexene % mol | | — | — | — | — | — | — | 0.5 | 1.0 | 0.5 |
| Hydrogen % mol | | 2.5 | 1.5 | 2.4 | 2.5 | 4.6 | 2.9 | 16.0 | 0.03 | 8.0 |
| $H_2/C_3H_6$ | | 0.033 | 0.019 | 0.032 | — | — | — | — | — | — |
| $C_2H_4/(C_2H_4+C_3H_6)$ | | 0.035 | 0.003 | 0.032 | 0.43 | 0.21 | 0.41 | — | — | — |
| $H_2/C_2H_4$ | | — | — | — | 0.069 | 0.083 | 0.080 | 1.6 | 0.01 | 1.6 |
| $C_6/(C_6+C_2)$ | | — | — | — | — | — | — | 0.05 | 0.25 | 0.09 |

TABLE 3

Physical/Mechanical Properties of the products

| | | Example 1 | | | | Example 2 | | | | Ex. 3 |
|---|---|---|---|---|---|---|---|---|---|---|
| | | 1 | 2A | 2B | Final | 1 | 2A | 2B | Final | Final |
| Melt Flow Rate L | dg/min | 6.2 | 5.5 | 5.7 | 5.8 | — | — | — | 15.4 | — |
| Xylene solubles | wt % | 6.0 | 1.5 | 5.8 | 5.1 | 79.7 | 91.9 | 82.9 | 20.4 | — |
| C2 content | wt % | 5.0 | 0.3 | 4.9 | 4.0 | 56.2 | 37.0 | 53.4 | 13.5 | — |
| IVXS | dl/g | — | — | — | — | — | — | — | 2.87 | — |
| IZOD @ 25° C. | kJ/m2 | — | — | — | — | — | — | — | 10.5 | — |
| Flex. Mod. | Mpa | — | — | — | — | — | — | — | 1007 | — |
| Melt Flow Rate P | dg/min | — | — | — | — | — | — | — | — | 20 |
| Density | g/cc | — | — | — | — | — | — | — | — | 0.955 |

The invention claimed is:

1. A process for gas-phase polymerization of α-olefins $CH_2$=CHR, wherein R is hydrogen or a hydrocarbon radical comprising 1-12 carbon atoms, carried out in a first interconnected polymerization zone, and a second interconnected polymerization zone, in which at least one of the α-olefins are fed in presence of a catalyst under reaction conditions, and from which a polymer product is discharged, wherein the process comprises:

growing polymer particles by flowing the polymer particles through the first interconnected polymerization zone under fast fluidization conditions;

the polymer particles leaving the first interconnected polymerization zone, and enter the second interconnected polymerization zone, wherein the polymer particles flow downward in a densified form, and leave the second interconnected polymerization zone, and are reintroduced into the first interconnected polymerization zone, the process further comprising:

(a) a gas mixture present in the first interconnected polymerization zone being totally or partially prevented from entering the second interconnected polymerization zone, and (b) a gaseous composition inside a portion of the second interconnected polymerization zone is maintained substantially similar to a gaseous composition reacting in the first interconnected polymerization zone;

wherein the process produces a (co)polymer composition, and at least one component of the (co)polymer composition is split by rising or lowering a feeding point of a corrective fluid in the second interconnected polymerization zone.

2. The process according to claim 1, wherein the gas mixture in the first interconnected polymerization zone is totally or partially prevented from entering the second interconnected polymerization zone by introducing into an upper part of the first interconnected polymerization zone a gas and/or liquid mixture comprising a composition different from the gas mixture present in the first interconnected polymerization zone.

3. The process according to claim 1, wherein the gaseous composition inside a portion of the second interconnected polymerization zone is maintained substantially similar to the gaseous composition reacting in the first interconnected polymerization zone, by feeding a fluid of the corrective fluid into an upper level of the portion of the second interconnected polymerization zone.

4. The process according to claim 3, wherein the corrective fluid is a gaseous mixture or a gas/liquid mixture.

5. The process according to claim 3, wherein by mutually mixing the corrective fluid and downwardly flowing gas in the second interconnected polymerization zone, condition (b) is satisfied.

6. The process according to claim 3, wherein the corrective fluid comes from a recycled gas stream.

7. The process according to claim 3, wherein the corrective fluid comprises monomers to be polymerized and condensable inert compounds.

8. The process acco-rding to claim 3, wherein the corrective fluid is adjusted by feeding make-up monomers, polymerization diluents, and hydrogen before introducing the corrective fluid into the second interconnected polymerization zone.

9. The polymerization process according to claim 1, where the process comprises an upstream polymerization technology, or downstream polymerization technology in a sequential, multistage polymerization process.

10. The polymerization process according to claim 9, wherein the process is a liquid-phase or a gas-phase process.

* * * * *